US010430766B2

(12) United States Patent
Hadatsuki

(10) Patent No.: US 10,430,766 B2
(45) Date of Patent: Oct. 1, 2019

(54) LIFE EVENT-BASED TRAVEL PLANNING

(71) Applicant: FUJITSU LIMITED, Kawasaki-shi, Kanagawa (JP)

(72) Inventor: Naomi Hadatsuki, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 869 days.

(21) Appl. No.: 14/919,642

(22) Filed: Oct. 21, 2015

(65) Prior Publication Data
US 2017/0116578 A1   Apr. 27, 2017

(51) Int. Cl.
G06Q 10/02 (2012.01)
G06Q 10/10 (2012.01)
G06Q 50/00 (2012.01)
G01C 21/34 (2006.01)

(52) U.S. Cl.
CPC ....... G06Q 10/1095 (2013.01); G01C 21/343 (2013.01); G06Q 10/02 (2013.01); G06Q 50/01 (2013.01)

(58) Field of Classification Search
CPC . G06Q 10/02–025; G06Q 50/01; G06Q 50/14
See application file for complete search history.

(56) References Cited

U.S. PATENT DOCUMENTS

| | | | |
|---|---|---|---|
| 8,473,198 B2 | 6/2013 | Krumm et al. | |
| 8,626,197 B1* | 1/2014 | Roche | H04W 4/185 455/456.3 |
| 9,363,221 B1* | 6/2016 | Ozog | H04L 67/306 |
| 9,596,207 B1* | 3/2017 | Lin | H04L 51/32 |
| 2003/0040946 A1* | 2/2003 | Sprenger | G06Q 10/025 705/6 |
| 2004/0148207 A1* | 7/2004 | Smith | G06Q 10/02 705/6 |

(Continued)

FOREIGN PATENT DOCUMENTS

WO   2003071775 A2   8/2003

OTHER PUBLICATIONS

Yoon, et al., Social itinerary recommendation from user-generated digital trails, PERS UBIQUIT COMPUT, vol. 16, pp. 469-484, 2012.*

(Continued)

Primary Examiner — Daniel Vetter
(74) Attorney, Agent, or Firm — Maschoff Brennan

(57) ABSTRACT

The present disclosure may include a method of automated travel planning including obtaining first and second life events as a basis for travel. The method may include receiving first electronic content and storing it such that it is associated with the first life event, receiving second electronic content and storing it such that it is associated with the second life event, and identifying a first location for the first life event and a second location for the second life event. The method may also include electronically generating a map of the first and second life events, the map including transportation between the first location and the second location, the first electronic content associated with the first life event, and the second electronic content associated with the second life event. The method may also include automatically generating an itinerary including the transportation between the first and second life events.

17 Claims, 10 Drawing Sheets

(56) References Cited

U.S. PATENT DOCUMENTS

| | | | | |
|---|---|---|---|---|
| 2006/0089792 | A1* | 4/2006 | Manber | G01C 21/3644 701/408 |
| 2007/0124304 | A1* | 5/2007 | Dimitrova | G06F 17/30247 |
| 2007/0161382 | A1* | 7/2007 | Melinger | H04L 67/18 455/456.1 |
| 2009/0157307 | A1* | 6/2009 | Krumm | G01C 21/26 701/533 |
| 2009/0216633 | A1* | 8/2009 | Whitsett | G06Q 30/02 705/14.36 |
| 2009/0313679 | A1* | 12/2009 | McAfee | G06Q 10/02 726/3 |
| 2010/0305984 | A1* | 12/2010 | Ben-Yitschak | G06Q 10/02 705/6 |
| 2010/0318571 | A1* | 12/2010 | Pearlman | H04L 63/104 707/784 |
| 2013/0073323 | A1* | 3/2013 | Zacharia | G06Q 10/025 705/5 |
| 2013/0239049 | A1* | 9/2013 | Perrodin | G06F 3/0481 715/800 |
| 2013/0268886 | A1* | 10/2013 | Sureshkumar | G06Q 10/025 715/810 |
| 2013/0275505 | A1* | 10/2013 | Gauglitz | G06Q 30/06 709/204 |
| 2014/0317201 | A1* | 10/2014 | McNeil | H04L 51/32 709/206 |
| 2014/0372910 | A1* | 12/2014 | Alford Mandzic | H04L 67/10 715/753 |
| 2015/0168150 | A1* | 6/2015 | Kahn | H04W 4/21 701/408 |
| 2015/0220983 | A1* | 8/2015 | Chauhan | G06Q 30/0255 705/14.53 |
| 2015/0296033 | A1* | 10/2015 | Jung | G06Q 50/01 709/217 |
| 2015/0317569 | A1* | 11/2015 | Renaudie | G06Q 10/02 705/5 |
| 2016/0350953 | A1* | 12/2016 | Mittelstaedt | G06T 11/60 |
| 2016/0367896 | A1* | 12/2016 | Lee | A63F 13/35 |
| 2018/0032997 | A1* | 2/2018 | Gordon | G06Q 20/3224 |

OTHER PUBLICATIONS

Tussyadiah, et al., Mediating Tourist Experiences: Access to Places via Shared Videos, Annals of Tourism Research, vol. 36, No. 1, pp. 24-40, 2009.*

Liu, et al., Travel arrangement as a moderator in image-satisfaction-behavior relations: An investigation of Chinese outbound travelers, Journal of Vacation Marketing, Jun. 2015, pp. 1-12.*

Nicoletta, et al., Tourists' opinions and their selection of tourism destination images: An affective and motivational evaluation, Tourism Management Perspectives, vol. 4, 2012, pp. 19-27.*

Van House, et al., From "What?" to "Why?": The Social Uses of Personal Photos, CSCW'04 Conference, Nov. 2004.*

Obrador, et al., Supporting Personal Photo Storytelling for Social Albums, MM'10 Conference, Oct. 2010.*

Facebook, Life Event, Facebook Help Center; Popular Features. Retrieved from https://www.facebook.com/help/137829936332495 (May 2015).

Facebook, A Look Back, Facebook Help Center; Popular Features, Retrieved from <https://www.facebook.com/help/206982576163229/> (Mar. 2015).

LifeBio, How LifeBio Works, Retrieved from <https://www.lifebio.com/Home/How-LifeBio-Works> Retrieved on Oct. 21, 2015.

My Life Software, Digital Life Story. Retrieved from <http://mylifesoftware.com/digital-life-story> Retrieved on Oct. 21, 2015.

* cited by examiner

LIFE EVENT-BASED TRAVEL PLANNING

FIELD

The embodiments discussed in the present disclosure are related to life-event based travel planning.

BACKGROUND

In recent years, travelers are becoming more interested in theme-oriented traveling. Themes may be based on many different types of sources, (e.g., books, movies, publications, family stories, etc.), which may contain plots, stories, events, scenes, and sites that are associated with real world locations that travelers may desire to visit.

The subject matter claimed herein is not limited to embodiments that solve any disadvantages or that operate only in environments such as those described above. Rather, this Background Section is provided to illustrate one exemplary technology area where embodiments of the present disclosure described herein may be practiced.

SUMMARY

In one or more embodiments, the present disclosure may include a method of automated travel planning. The method may include obtaining a first life event and a second life event as a basis for travel. The method may also include receiving first electronic content and storing the first electronic content such that the first electronic content is associated with the first life event, and receiving second electronic content and storing the second electronic content such that the second electronic content is associated with the second life event. The method may further include identifying a first location for the first life event and a second location for the second life event. The method may also include electronically generating a map of the first life event and the second life event. The map may also include transportation between the first location and the second location. The map may additionally include the first electronic content associated with the first life event and the second electronic content associated with the second life event. The method may also include automatically generating an itinerary that may include the transportation between the first life event and the second life event.

The object and advantages of the embodiments will be realized and achieved at least by the elements, features, and combinations particularly pointed out in the claims.

Both the foregoing general description and the following detailed description provide examples and are explanatory and are not restrictive.

BRIEF DESCRIPTION OF THE DRAWINGS

Example embodiments will be described and explained with additional specificity and detail through the use of the accompanying drawings in which.

DESCRIPTION

The present disclosure relates to life event based travel planning. A "life event" may include any event or series of events which may have a particular meaning or significance to a user, and a few illustrative and non-limiting examples are seen in TABLE 1 below. In some embodiments, a user may select or have provided to them a series of life events as the basis of travel plans. Electronic content associated with the life event (for example, pictures, music, videos, etc.) may be stored in association with the life event, in some embodiments. A location for the life events may also be provided or determined. A map may be provided to a user with the life event at the location and the associated electronic content of the life event. The map may also include potential travel options between the life event locations. After selecting the travel options, an itinerary may be provided to the user of the life events, the associated electronic content, and the travel between the life events. Travel accommodations may also be automatically booked. After travel has begun, when a traveler using the itinerary arrives at the location of one of the life events, the electronic content associated with that life event may be delivered to the traveler.

As used in the present disclosure, the term "life event" may refer to an event in the life of a user or friend/family member of the user that occurred in the past and has some significance to the user. As a few non-limiting examples, a life event may include a wedding, a funeral, a birth, moving in to a first home, a first date, a new job, a promotion at a job, a family vacation, a wedding of parents, a first date of parents, etc. In some embodiments, a life event may have a life event attribute and/or an importance attribute signifying the importance of the life event, for example, a birth of a first child of a user may have a higher life event attribute score and/or importance attribute score than that of a summer job during teen years of the user.

Embodiments of the present disclosure are explained with reference to the accompanying drawings.

Figure 1:
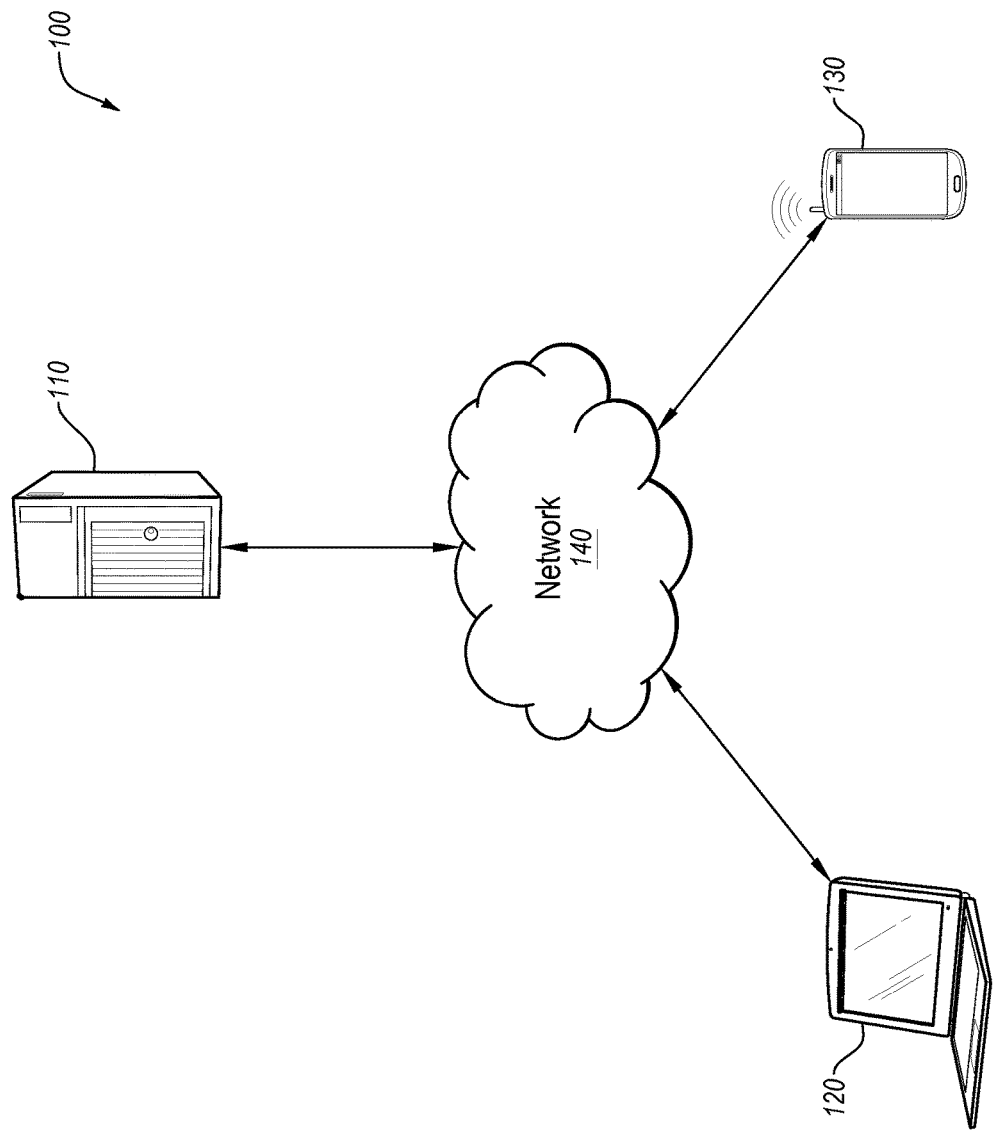
FIG. 1 is a diagram of an example system configured for life event based travel planning.

FIG. 1 is a diagram of an example system 100 for life event-based travel planning, in accordance with some embodiments of the present disclosure. The system 100 may include a travel planning server 110, a travel planning client 120, a traveler portable device 130, and a network 140 for communication. The travel planning server 110 may communicate with the travel planning client 120 via the network 140 to arrange life event-based travel. For example, the travel planning server 110 may gather life events, electronic content, locations, and/or options for transportation and present them to a user of the travel planning client 120. The travel planning client 120 may provide responses to queries from the travel planning server 110 and/or may input user-selected information to plan the life event-based travel.

After travel has started, the travel planning server 110 may send and/or receive content from the traveler portable device 130 via the network 140. For example, the travel planning server 110 may send electronic content associated with life events to the traveler portable device 130. Additionally, the traveler portable device 130 may send electronic content to the travel planning server 110.

The network 140 may include any device, system, component, or combination thereof configured to provide communication between one or more of the travel planning server 110, the travel planning client 120, and the traveler portable device 130. By way of example, the network 140 may include one or more wide area networks (WANs) and/or local area networks (LANs) that enable the travel planning server 110, the travel planning client 120, and/or the traveler portable device 130 to be in communication. In some embodiments, the network 140 may include the Internet, including a global internetwork formed by logical and physical connections between multiple WANs and/or LANs. Alternately or additionally, the network 140 may include one or more cellular RF networks and/or one or more wired and/or wireless networks such as, but not limited to, 802.xx networks, Bluetooth access points, wireless access points, IP-based networks, or the like. The network 140 may also include servers that enable one type of network to interface with another type of network. Additionally or alternatively, the network 140 may include an Intranet, or one or more computing devices in communication within an organization or an in otherwise secure manner.

Modifications, additions, or omissions may be made to FIG. 1 without departing from the scope of the present disclosure. For example, the system 100 may include more or fewer elements than those illustrated and described in the present disclosure. For example, the system 100 may include a third party that may provide input to the travel plans by way of electronic content, life events, and/or social media data.

Figure 2:
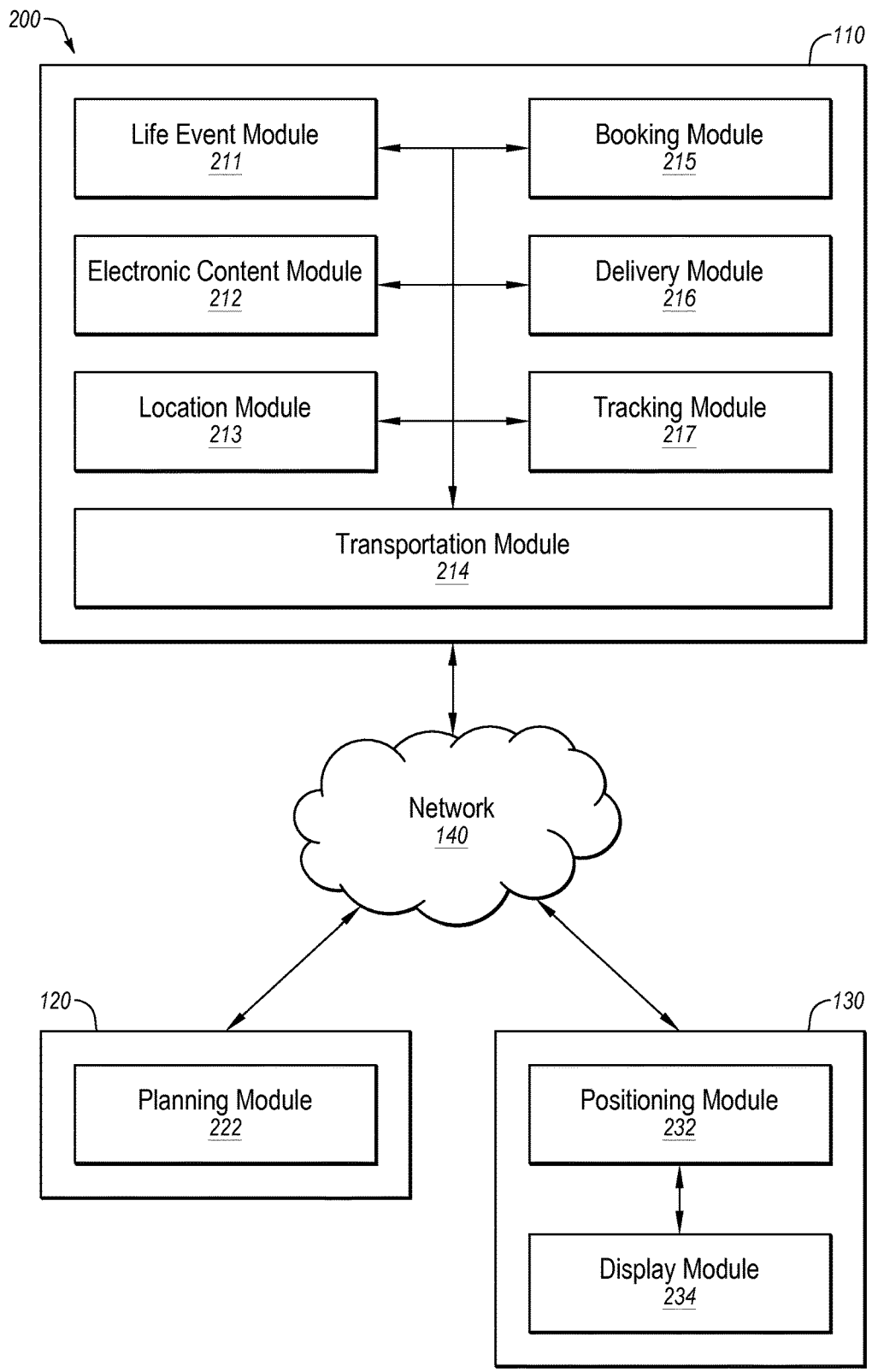
FIG. 2 is a block diagram of an example system configured for life event-based travel planning.

The operation and interaction of the travel planning server 110, the travel planning client 120, and the traveler portable device 130 may be described in greater detail in FIG. 2. Any of the travel planning server 110, the travel planning client 120, and the traveler portable device 130 may be implemented as a computing device as described with respect to FIG. 6.

FIG. 2 is a block diagram of an example system 200 for life event-based travel planning, in accordance with some embodiments of the present disclosure. The system 200 may include the travel planning server 110, the travel planning client 120, the traveler portable device 130, and the network 140. The travel planning server 110 may include one or more modules to facilitate the planning of life event-based travel, including, for example, a life event module 211, an electronic content module 212, a location module 213, a transportation module 214, a booking module 215, a delivery module 216, and/or a tracking module 217. The travel planning client 120 may include a planning module 222. The traveler portable device 130 may include a positioning module 232 and a display module 234.

Figure 6:
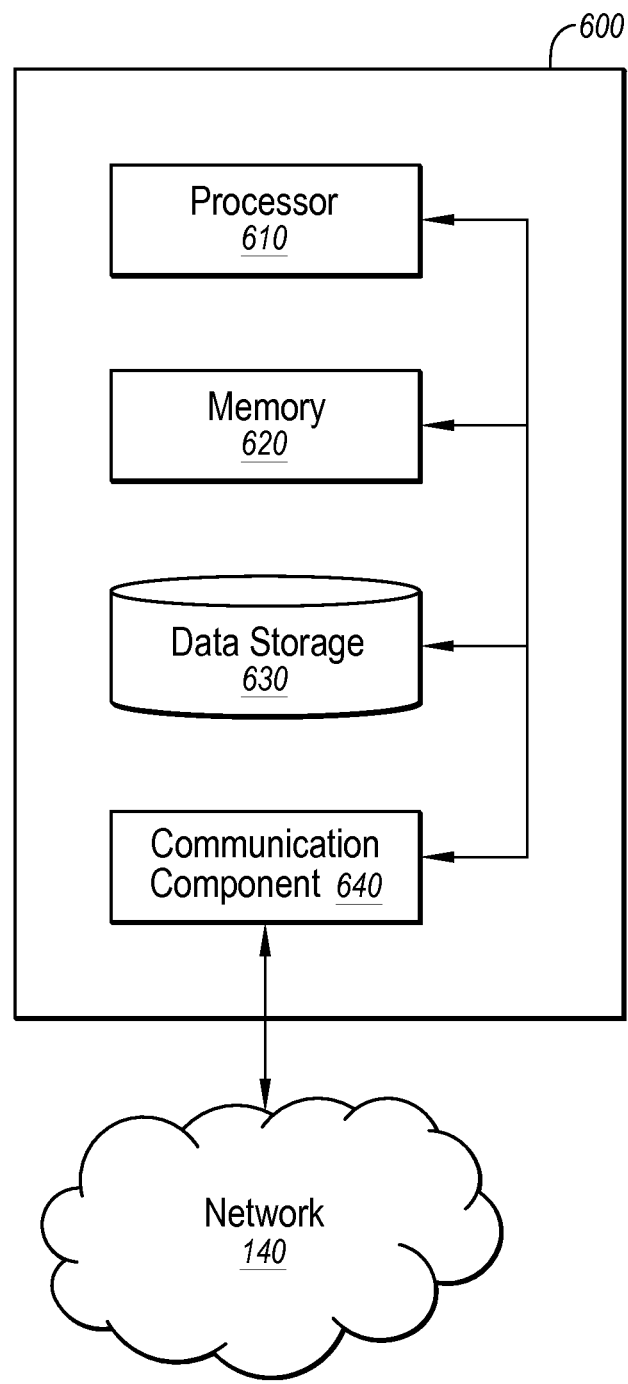
FIG. 6 is a block diagram of an example system configured for life event based travel planning.

In some embodiments, any of the components and/or sub-components of the system 200, including but not limited to the travel planning server 110, the life event module 211, the electronic content module 212, the location module 213, the transportation module 214, the booking module 215, the delivery module 216, the tracking module 217, the travel planning client 120, the planning module 222, the traveler portable device 130, the positioning module 232, and/or the display module 234 may be implemented as hardware, software, or any combination thereof. For example, any of the modules 211, 212, 213, 214, 215, 216, and 217 may be implemented as one or more processes or routines of instructions stored and/or implemented by the travel planning server 110. Additionally or alternatively, any of the modules 211, 212, 213, 214, 215, 216, and 217 may be implemented as a physical device associated with the travel planning server 110, such as a processor with associated memory, microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or as a computing device as illustrated in FIG. 6. Additionally or alternatively, the planning module 222 may be implemented with respect to the travel planning client 120 in a similar manner to the description of how the modules 211, 212, 213, 214, 215, 216, and 217 may be implemented with respect to the travel planning server 110. Additionally or alternatively, the modules 232 and 234 may be implemented with respect to the traveler portable device 130 in a similar manner to the description of how the modules 211, 212, 213, 214, 215, 216, and 217 may be implemented with respect to the travel planning server 110.

The modules of the travel planning server 110 may be described with respect to planning life event-based travel. The life event module 211 may be configured to receive one or more life events to be used in planning travel. In some embodiments, the life events may be identified within social networking data. For example, a user may identify one or more social networking accounts or locations for the travel planning server 110 to use as a source for pulling social networking data. The social networking data may be gathered from any one or combination of social media sources, for example, a FACEBOOK® account, TWITTER® account, GOOGLE+® account, SNAPCHAT® account, MYSPACE® account, LINKEDIN® account, PINTEREST® account, INSTAGRAM® account, TUMBLR® account, FLICKR® account, VINE® account, YOUTUBE® account, blog, personal web page, email account, etc.

The life event module 211 may collect and filter social media data from the social media sources to identify life events. Identifying a life event in the social media data may be determined based on a number of life event attributes. In some embodiments, the life event module 211 may analyze any text in the social media data searching for key words associated with life events. For example, TABLE 1 includes an example list of life events and associated words for which searches may be performed. However, TABLE 1 is simply an example and any number of events and/or potentially related words are within the scope of the present disclosure:

TABLE 1

| Life Event | Potentially Related Words |
| --- | --- |
| Wedding and/or engagement | wedding, love, ring, engagement, engaged, bride, video, marrying |
| Beginning of romantic relationship | boyfriend, girlfriend, date, check, relationship, see, look |
| Anniversary | anniversary, years, year, married, celebrating, wife, celebrate, love |
| Relationship ending and/or divorce | relationship, ended, hurt, hate, divorce, blessings, single |
| Graduation | graduation, school, college, graduate, graduating, year, grad |
| Admission | admitted, university, admission, accepted, college, offer, school |
| Exam | passed, exam, test, school, semester, finished, exams, midterms |
| Research | research, presentation, journalism, paper, conference, go, writing |
| Essay and/or Thesis | essay, thesis, reading, statement, dissertation, complete, project |

TABLE 1-continued

| Life Event | Potentially Related Words |
| --- | --- |
| Job | job, accepted, announce, join, joining, offer, starting, announced, work |
| Interview and/or Internship | interview, position, accepted, internship, offered, start, work |
| Moving | house, moving, move, city, home, car, place, apartment, town, leaving |
| Travel | leave, leaving, flight, home, miss, house, airport, packing, morning |
| Vacation | vacation, family, trip, country, go flying, visited, holiday, Hawaii |
| Winning award | won, award, support, awards, winning, honor, scholarship, prize |
| Election and/or promotion and/or nomination | president, elected, run, nominated, named, promotion, selected, business, vote |
| Publishing | book, sold, writing, finished, read, copy, review, release, books, cover |
| Contract | signed, contract, deal, agreements, agreed, produce, dollar, meeting |
| Song and/or video and/or album release | video, song, album, check, show, see, making, radio, love |
| Acting | play, role, acting, drama, played, series, movie, actor, theater |
| Death | dies, passed, cancer, family, hospital, dad, grandma, mom, grandpa |
| Birth | baby, born, boy, pregnancy, girl, pounds, son, world, daughter, birth |
| Illness | ill, hospital, feeling, sick, cold, flu, getting, fever, doctors, cough |
| Surgery | surgery, got, test, emergency, blood, tumor, stomach, hospital, pain, brain |

A few examples using the terms from TABLE 1 are provided. As a first example, a user may have a FACEBOOK® post including a picture of a new baby saying "Welcome to our new baby boy, weighing in at seven pounds six ounces." By searching through the text of the social media data, the life event module 211 may determine that it is likely that a birth occurred associated with that social media data. The identification of the terms above may be an example of a life event attribute. In some embodiments, the life event module 211 may send the associated image to the electronic content module 212 as electronic content associated with the life event. The life event module 211 may parse other related social media around the same time or with similar language associated with the birth. Such parsing and searching may yield additional electronic content associated with the life event which may be passed to the electronic content module 212. Such parsing and searching may also be used to validate that the event was a life event and/or characterize the importance of the life event. For example, by parsing the language of comments and/or other social media data to determine whether the birth was a child of the user, a child of a relative of the user, or a child of a friend of the user. While each of those scenarios may be a life event, a friend's birth of a child may be assigned a lower importance attribute than the birth of a child of the user.

As another example, a user may have posted a blog post telling a story about a first date with his fiancé, including what songs they listened to on the date. The life event module 211 may analyze the social media data and find words identifying the entry as describing the first date with the fiancé and may identify it as a life event. The life event module 211 may also send related electronic content to the electronic content module 212, such as the songs listened to on the date.

The life event module 211 may use categorizations of data utilized from the social media data. For example, a Life Event category from FACEBOOK® or a New Job event from LINKEDIN® may be used to identify a life event.

In some embodiments, the life event module 211 may utilize one or more life event attributes derived from the social media data to identify life events. The life event attributes may include a counter that increases each time one of the possibly related terms is used in a social media entry. The life event attributes may include when, how often, or the number of other users who comment on or provide positive feedback to a given event. The life event attributes may include a category of event from the social media provider (e.g. New Job status, Relationship Status change, Live Event category). The life event attributes may include how many times a video has been viewed, including by the user. The life event attributes may include who is identified as being in a photograph/video. The life event attributes may include analysis of what emotions are shown in a picture or video. In some embodiments, if the user provides comments or positive feedback on his own social media entry, or watch his own videos, etc., that may also be reflected in the life event attributes.

The life event module 211 may collect the identified life events and prioritize the life events in a list. In some embodiments, the list simply prioritizes each life event as a stand-alone event. Additionally or alternatively, the life event module 211 may group a plurality of life events together and may prioritize the life events as a group rather than as individual events.

In some embodiments, the life event module 211 may utilize one or more importance attributes in prioritizing the life events or groups of life events. In some embodiments, the importance attributes may be the same attributes and/or factors used to determine whether or not an event was a life event. For example, the importance attributes may include the number of comments or positive responses to a social media entry about a life event, who commented on the social media entry, the number of people who reposted or shared the social media entry, who reposted or shared the social media entry, the number of views of a video/photograph about a life event, who viewed the video/photograph, who is identified in the photograph/video, whether people are smiling or otherwise expressing positive emotions in the photograph/video, who is expressing positive emotion in the photograph/video, the type of life event, etc.

In some embodiments, the importance attributes for a given life event may be weighted and then summed to yield a value used in prioritizing the life events. The weight to be given a particular importance attribute may be based on a user selection at the planning module 222. For example, a user may select that tagging a family member in a photo has a greater weight in importance than the number of votes for a social media entry associated with a life event. In another example, it may be determined that some information such as ratings or reviews may be given greater weight than other information such as a social media category of event. Alternatively or additionally, the weight to be given a particular importance attribute may be based on a default setting set by a system administrator or designer of the system 200.

After the life events have been prioritized by the life event module 211, the list of prioritized events may be transmitted to the planning module 222 of the travel planning client 120. The list may include any of the social media data and/or electronic content associated with the life events. For example, for a given life event in the list, the life event may have displayed comments made about the social media entries about the life event, any associated votes or "likes"

for the social media entries, and any electronic content like photographs or videos associated with the life event. The user at the travel planning client 120 may select one or more of the life events as a basis for a travel plan.

In some embodiments, the user may input his own desired life events for a travel plan. User input may be triggered by the life event module 211 requesting manual entry of life event information from the user or from the user selecting to do so at the travel planning client 120. In these and other embodiments, a third party may also input life events for the travel plan. For example, a user may request that his parents input life events based on how the parents met, courted, and were married. In some embodiments, user-input life events or third-party entered life events may be automatically included in the travel plan. Alternatively or additionally, user-input life events or third-party entered life events may be given a very high importance attribute, or may be placed at the top of the list from which the user may select life events as the basis for the travel plan.

The electronic content module 212 may act as a relational database and/or a storage location for electronic content associated with a life event. For example, a life event may have photographs, videos, music, text, or other electronic content that may have been captured or experienced when the life event occurred. The electronic content module 212 may store the electronic content and/or may associate the electronic content with the corresponding life event. Using the association, the electronic content may be recalled in association with the life event.

In some embodiments, one or more components of the electronic content may be selected as representative of the life event. For example, a user may select a photograph or a still frame from a video as representative of a life event. Additionally or alternatively, the life event module 211 may automatically select a photograph or video as representative of the life event. In some embodiments, when presented with the list of life events to select from, the list may include the life event and the representative electronic content.

The location module 213 may be configured to determine and/or query the location of life events. For example, the location module 213 may parse the social media data associated with a given life event to find an address or geographic coordinates of the given life event. If the address or geographic coordinates cannot be located, the location module 213 may query a web service such as a web page or service that may have addresses or geographic coordinates (e.g. Google Maps® or Wikipedia®) to attempt to determine the location of the life event. If the location of the life event cannot be found, the location module 213 may query the user at the travel planning client 120. The location may also include other identifying information that may be beneficial in assisting a traveler to find the location of the life event. In some embodiments, the location module 213 may also query a third party, for example, if the third party manually entered a life event and the location was unknown. The various sources of location information may be utilized in any order, for example, the location module may query a third party before checking a web page or service that may have addresses, etc.

In some embodiments, when presenting the user with a list of the life events from which to select the basis for the travel, the list may be presented in a map format based on the location determined by the location module 213. The map may include, for example, icons at the location for the life events and one or more components of the electronic content, such as the representative electronic content. In some embodiments, one life event at a time may be displayed to a user.

The planning module 222 of the travel planning client 120 may include any module, program, set of instructions, device, component, or system configured to allow a user to interact with the travel planning client 120 to facilitate planning of life-event based travel. In some embodiments, the user may interact with the planning module 222 through a graphical user interface (GUI), which may be output on the travel planning client 120. Additionally or alternatively, the user may interact with the planning module 222 through the use of one or more input devices, such as a touchscreen, a typewriter, a mouse, a microphone, or other suitable input device. The user may submit various choices and selections as input into the planning module 222 through the GUI, including but not limited to: selections relating to one or more of the life events as a basis for the places to travel, manually entered data such as a manually entered life event which did not appear in the list of life events, desired geographic area(s) to visit, desired time frame(s) for visiting, selecting electronic content associated with a life event, selecting the order for visiting each place, selecting a method of transportation between each place to visit, manually entering electronic content, etc.

Figure 3:
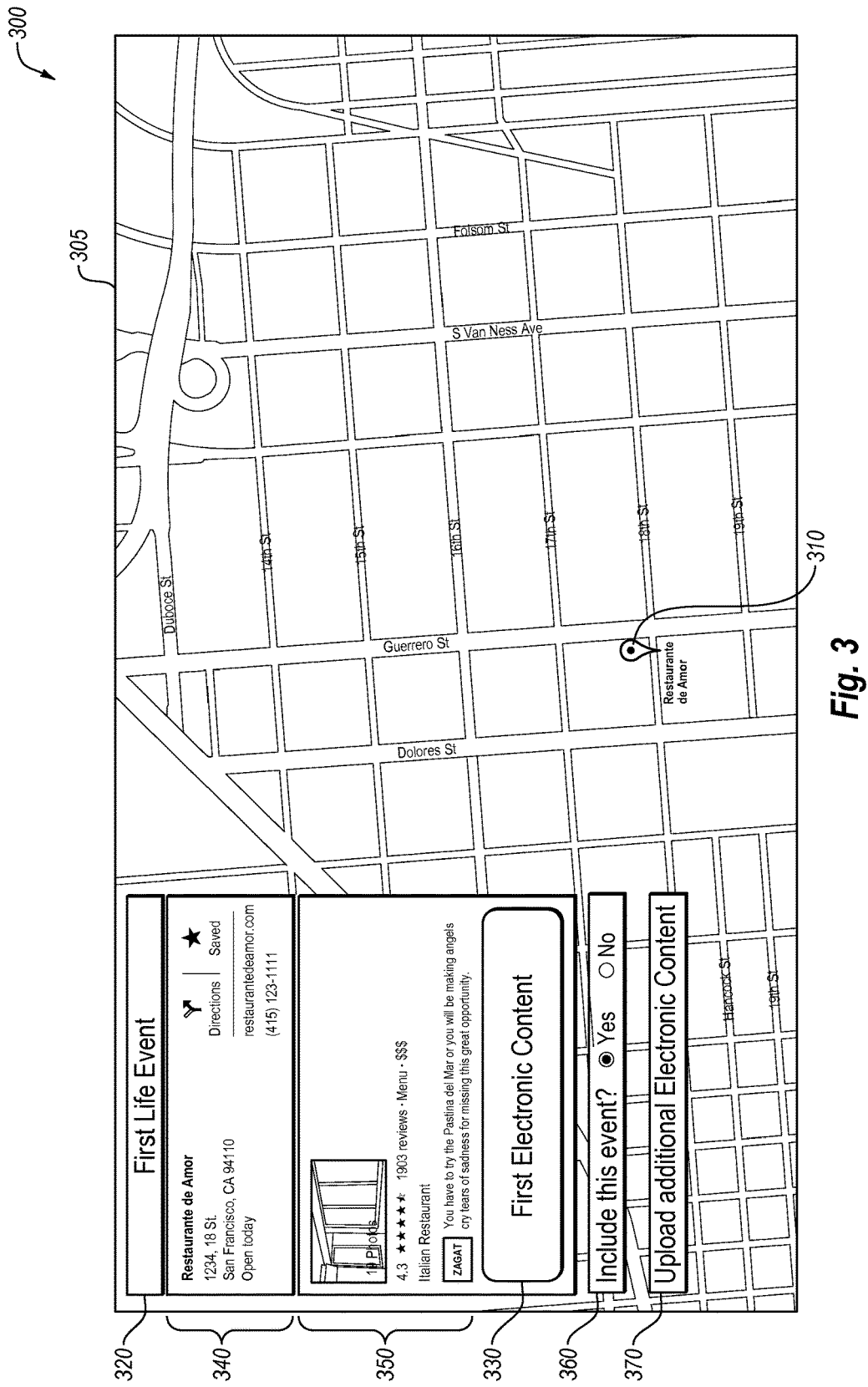
FIG. 3 is an example of a display of a life event for consideration in travel.

FIG. 3 is an example of a display 300 of a life event for consideration in travel, in accordance with some embodiments of the present disclosure. The display 300 may include a map 305 with an icon 310 at the location of a first life event considered as a basis for travel. The display 300 may include a name of the life event 320 and electronic content 330 of the life event. The electronic content 330 may include the representative electronic content and/or may include other electronic content.

The display 300 may also include other information regarding the location of the life event. For example, a location name and address 340 of the life event may be displayed. Additionally, other information 350 about the location may be displayed. The other information may include reviews, rankings, ratings, images, hours of operation, suggested duration for a visit, price, descriptions, helpful tips, etc. and links to additional information.

The display 300 may also include a user selectable feature 360 to indicate whether or not the user would like to include the life event in the travel plans of the user. The display 300 may also include a user selectable feature 370 to upload additional electronic content to be associated with the life event.

In some embodiments, the user may be provided a display such as display 300 after the user has selected the first life event as a basis for travel. The user may use the display 300 to view the electronic content 330 associated with the life event. In these and other embodiments, the user may add, remove, or revise the order of the electronic content associated with the life event. By revising what electronic content 330 is associated with the life event and/or changing the order, the user may control what electronic content 330, including the order, may be provided to a traveler following the itinerary when the traveler is at the location of the first life event.

While one visual depiction of the display 300 is provided in FIG. 3, the style and format of the display is simply an example used for convenience in describing the principles of the present disclosure and is in no way limiting. Any number of additions, omissions, or revisions to the display 300 may be included within the scope of the present disclosure. For example, in some embodiments the user may be provided with relevant commercial content such as advertisements or e-commerce offers such as travel packages, coupons, etc. for locations at or near the location of the life event.

Returning to FIG. 2, the transportation module 214 may be configured to use the locations of the life events found by the location module 213 to display transportation options between one or more of the life events.

Transportation options may include different transportation options that may be available to a traveler between different life events. Example transportation options may include, but are not limited to: car, taxi, bus, subway, train, trolley, cable car, walking, bike, motorcycle, scooter, SEG-WAY® scooter, rickshaw, airplane, jet, helicopter, snow machine, boat, tramway, gondola, etc. Additionally, transportation options may include data associated with the transportation option such as price, arrival and departure times, schedules, pick-up and drop-off locations, estimated travel times between the life events, and the like. The transportation options may be obtained from one or more transportation option databases (not shown), or from any website that contains transportation option information between potential places to visit 302 such as GOOGLE MAPS®, or from any other suitable source.

Figure 4:
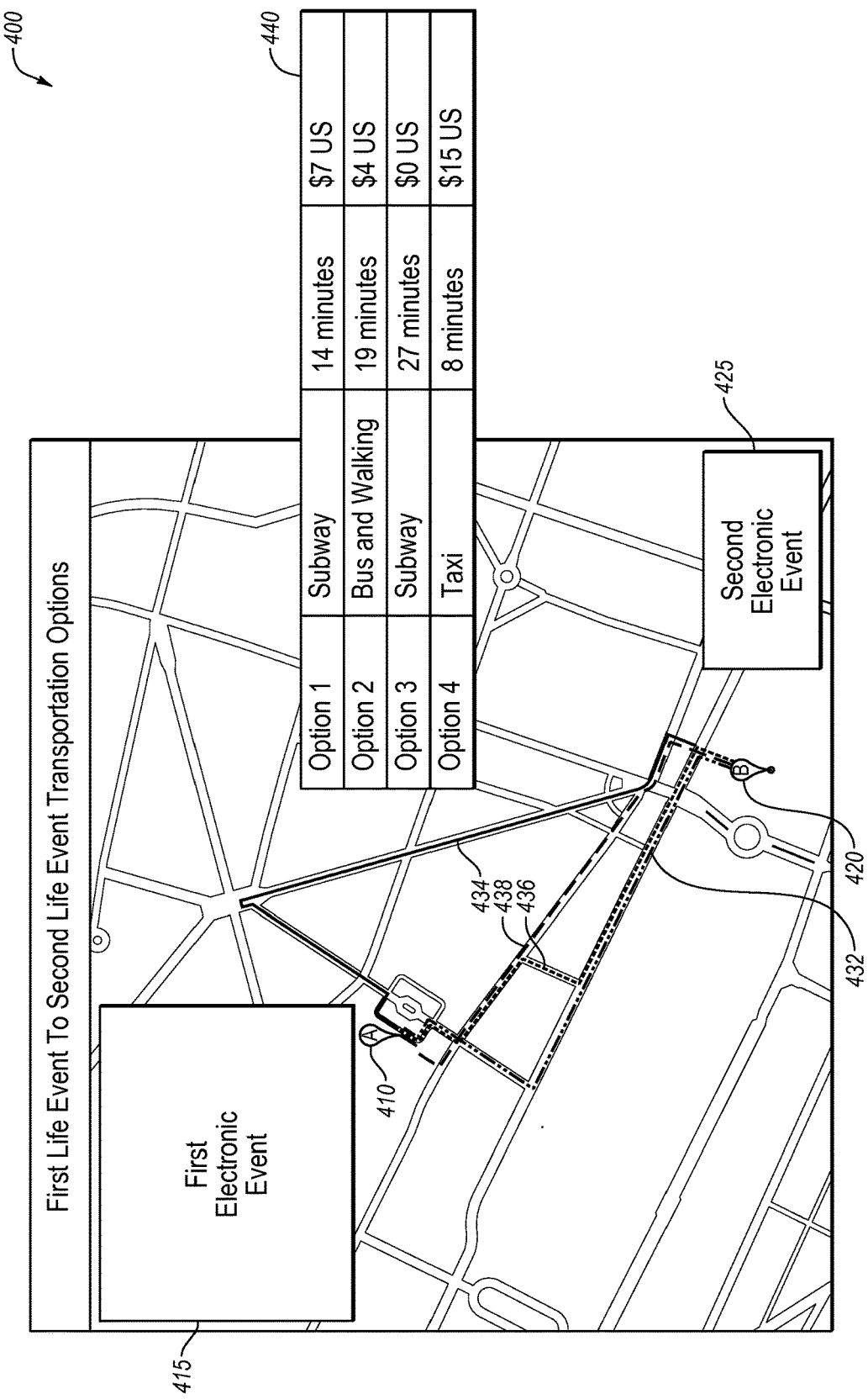
FIG. 4 is an example of a display of transportation options.

FIG. 4 is an example of a display 400 of transportation options, in accordance with some embodiments of the present disclosure. The display 400 may include a first icon 410 for a first life event and may include first electronic content 415 associated with the first life event. The first electronic content 415 may be representative electronic content of the first life event or may be some or all of the electronic content associated with the first life event. The display 400 may include a second icon 420 associated with the second life event and may include second electronic content 425 associated with the second life event. The second electronic content 425 may be representative electronic content of the second life event or may be some or all of the electronic content associated with the second life event.

The display 400 may also include multiple transportation options visually depicted between the first icon 410 and the second icon 420. For example, a first option 432 of taking a subway may be visually depicted on the display 400; a second option 434 of taking a bus and walking may be visually depicted on the display 400; a third option 436 of walking may be visually depicted on the display 400; and a fourth option 438 of taking a taxi may be visually depicted on the visual display. In these and other embodiments, a tabular depiction of the different options may also be provided, for example by table 440. The table 440 may include an option number, a transportation modality, a travel time, and an estimated cost for each of the transportation options between the first life event and the second life event. While not depicted, the table 440 may also include additional information such as arrival and departure times, user reviews of the travel modalities and/or providers, contact information for the travel providers, etc.

The display 400 may also include one or more user selectable features to allow the user to select one of the transportation options in getting from the first life event location to the second life event location in the planned travel. For example, entries in the table 440 may be hyperlinked to allow a user to click on one of the entries, or the first option 432, the second option 434, the third option 436, and the fourth option 438 may be user selectable or hyperlinked such that the user may click on the route or otherwise select one of the routes.

In some embodiments, the display 400 may include additional information about the first life event and/or the second life event. For example, any of the information provided in the list of life events or in the display 300 of FIG. 3 may be provided on the display 400 of FIG. 4 to provide greater context to the first and second life events. Providing greater context may better allow the user to select a transportation option.

While one visual depiction of the display 400 is provided in FIG. 4, the style and format of the display is simply an example used for convenience in describing the principles of the present disclosure and is in no way limiting. Any number of additions, omissions, or revisions to the display 400 may be included within the scope of the present disclosure. For example, in some embodiments the user may be provided with relevant commercial content such as advertisements or e-commerce offers such as travel packages, coupons, etc. for locations at or near the locations of the first and/or second life events.

Returning to FIG. 2, the booking module 215 may be configured to create an itinerary of travel plans. The itinerary may be based on the life events selected by the user and the transportation options selected by the user. Alternatively or additionally, the booking module 215 may automatically select one or more of the life events and/or the transportation options without user input. The itinerary generated by the booking module 215 may also include electronic content associated with the life events. For example, if the user selected a photograph and two videos to be associated with a first life event, the itinerary may include the photograph and two videos in association with the first life event.

In some embodiments, the itinerary may also include other travel accommodations such as lodging, meals (including locations to eat), suggested durations or time periods to stay at each life event and/or each other location, etc.

In some embodiments, the booking module 215 may be configured to purchase travel accommodations in accordance with the itinerary. For example, the booking module 215 may purchase airline tickets, reserve car rentals, purchase bus tickets, purchase train tickets, reserve hotel rooms, reserve admission tickets, etc. In these and other embodiments, the booking module 215 may automatically purchase travel accommodations. The booking module 215 may also solicit offers from any travel vendor and may provide one or more of those choices to the user for his selection.

In some embodiments, the booking module 215 may include a profile of a traveler. The profile may include one or more of a name, a username, an address, an e-mail address, a mobile phone number, a date of birth, or other information of the traveler. The profile may also include one or more preferences of the traveler with respect to building travel plans. For example, the profile may indicate one or more geographic areas of interest to the traveler, preferred travel times (e.g., particular seasons, months, weeks, days of the week, time of day), preferred transportation modes and carriers, preferred accommodation types and providers, preferred food types and restaurants, etc.

Figure 5:
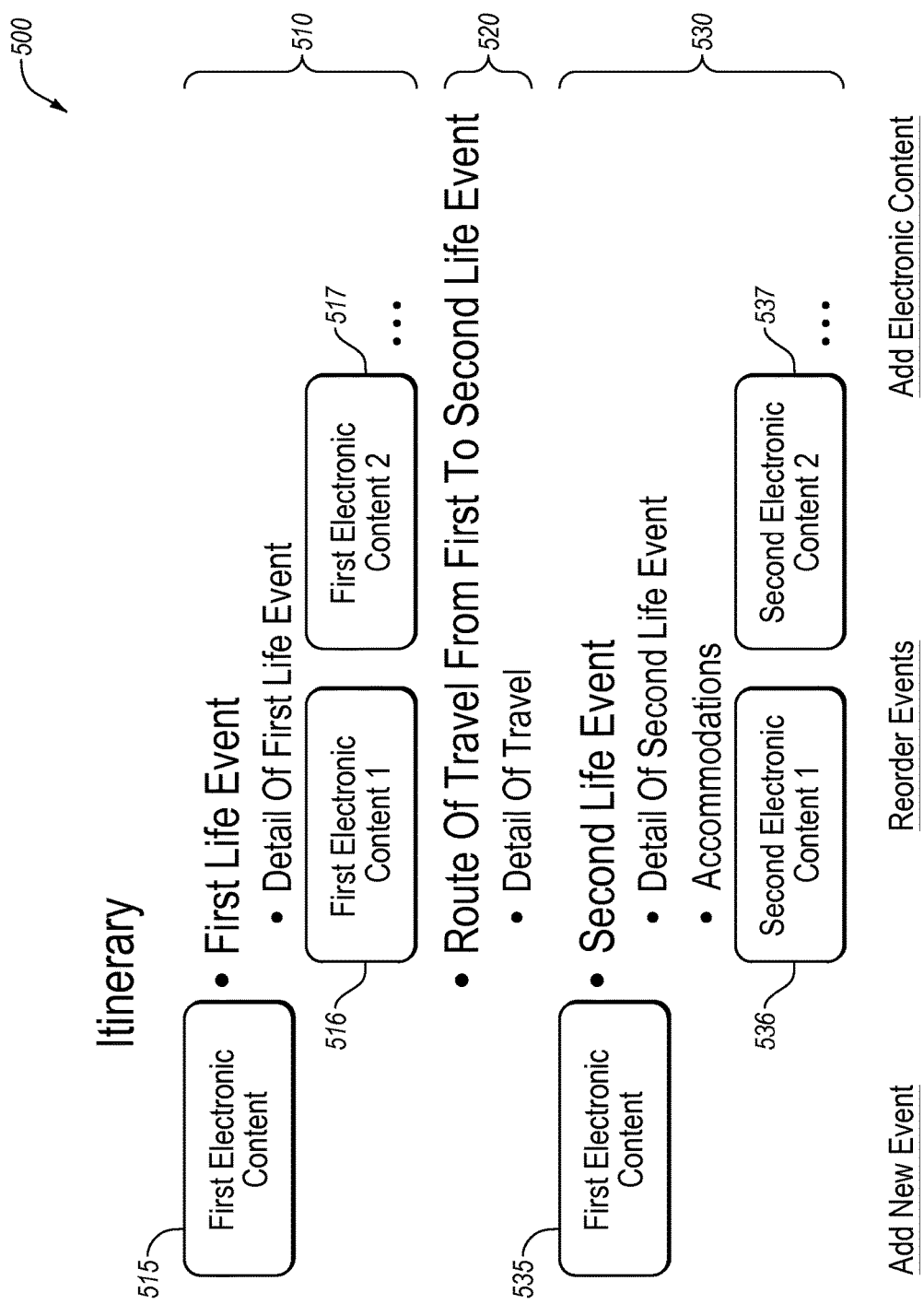
FIG. 5 is an example life event-based travel itinerary.

FIG. 5 is an example life event-based travel itinerary 500, in accordance with some embodiments of the present disclosure. The itinerary 500 may include a first life event 510, a route 520 for travel between the first life event 510 and a second life event 530, and the second life event 530. The itinerary 500 may provide a user a visual depiction of the order of the planned travel, the transportation between the life events, and any associated electronic content of the life events.

The first life event 510 may include details of the life event and a representative first electronic content 515 associated with the first life event 510. The details of the first life event 510 may include any information regarding the first life event 510. Such details may include, for example, a location of the first life event 510, an address of the first life event 510, a list of individuals present for the first life event 510, hours of operation at the location of the first life event 510, reviews for the location of the first life event 510, ticket prices for the location of the first life event 510, a short description of what occurred at the first life event 510, etc. The first life event 510 may also include other components of electronic content, such as electronic content 516 and 517 (labeled as "First Electronic Content 1" and "First Electronic Content 2"). The electronic content 516 and 517 may represent electronic content to be delivered to a traveler when he arrives at the location of the first life event 510. The ellipses after the electronic content 517 signifies that any number of components of electronic content may be included with the first life event 510.

The second life event 530 may be configured and/or arranged in a similar manner to the first life event 510, or may not be. The second life event 530 may include details of the second life event 530 and a representative second electronic content 535 associated with the second life event 530. The second life event 530 may also include other components of electronic content, such as electronic content 536 and 537 (labeled as "Second Electronic Content 1" and "Second Electronic Content 2"). The electronic content 536 and 537 may represent electronic content to be delivered to a traveler when the traveler arrives at the location of the second life event 530. The ellipses after the electronic content 537 signifies that any number of components of electronic content may be included with the second life event 530.

In some embodiments, there may be no electronic content associated with a life event. In some embodiments, electronic content may be hidden from the user until the traveler arrives at the location of the life event. For example, if a third party has been asked to provide electronic content associated with a life event, the third party may designate that electronic content as hidden content to be kept from the user until the traveler arrives at the location of the life event. Such a hidden feature may be used, for example, if a parent has a recorded video for her child the parent wants the child to watch when the child arrives at the life event location, or a spouse may have a letter to be delivered when the partner of the spouse arrives at the life event location, etc.

In addition to the first life event 510 and the second life event 530, the itinerary 500 may provide information regarding the route 520. For example, the route 520 may include a transportation option selected by the user to travel from the location of the first life event 510 and the second life event 530. The route 520 may include any number of details regarding the route 520, including, for example, a modality of transportation (e.g. bus, walking, taxi), a departure time, an arrival time, a monetary cost, an estimated travel time, a business name operating the modality of transportation, an image showing the modality of transportation, an image showing where the traveler may board or begin his transportation, a list of directions for the traveler to follow, etc.

In some embodiments, modifications may be made to the itinerary 500 by the user. For example, the user may select to add a new life event to the itinerary 500, to reorder life events of the itinerary 500, and/or to add electronic content to one or more of the life events of the itinerary 500.

In some embodiments, the user may manually enter a new life event or may select an additional life event from a list. For example, to add a new life event the user may interact with the planning module 222 of FIG. 2 to enter a new life event to be included in the itinerary 500. As another example, the user may be provided with the list of prioritized life events, and may select an additional life event to be included in the itinerary 500.

In some embodiments, the user may reorder the life events of the itinerary 500. For example, the user may click and drag the first life event 510 below the second life event 530. In these and other embodiments, in response to reordering the life events of the itinerary, a travel planning server may reverse the route 520 to the extent permitted by the transportation option selected by the user. For example, if the user had selected to walk from the location of the first life event 510 to the location of the second life event 530 and the order was reversed, the travel planning server may maintain walking from the location of the second life event 530 to the location of the first life event 510. The travel planning server may revise some details of the route 520, such as directions, estimated travel times, departure times, arrival times, etc.

In some embodiments, the user may add additional electronic content to one or more of the life events. To add electronic content to one of the life events, a user may be provided with a list or visual depiction of some or all electronic content associated with the life event so the user may select one or more components of electronic content to be included in the itinerary. Additionally or alternatively, the user may select to manually upload additional electronic content to be included in the itinerary. For example, after selecting an option to manually add electronic content, the user may be prompted at the planning module 220 of FIG. 2 to select electronic content to upload, and the electronic content selected by the user may then be communicated from the travel planning client 120 of FIG. 2 to the electronic content module 212 of the travel planning server 110 of FIG. 2 and associated with the corresponding life event.

Modifications, additions, or omissions may be made to FIG. 2 without departing from the scope of the present disclosure. For example, the system 200 may include more or fewer elements than those illustrated and described in the present disclosure. For example, the system 200 may include any number of servers, clients, and/or portable devices. As another example, the functions of the travel planning server 110, the travel client 120 and/or the traveler portable device 130 may be combined in fewer or greater devices, such as a single device performing all of the functions. Additionally, the different modules of FIG. 2 are merely examples and their locations and associated operations are only illustrative and may vary from that described in the present disclosure. The operations of any of the modules may be combined into fewer modules or expanded into more modules. Additionally or alternatively, any of the modules or their associated operations may be performed at any of the devices illustrated, including the travel planning server 110, the travel client 120 and/or the traveler portable device 130.

Modifications, additions, or omissions may be made to FIG. 5 without departing from the scope of the present disclosure. For example, the itinerary 500 may include more or fewer elements than those illustrated and described in the present disclosure. For example, the itinerary 500 may include any number of life events and routes between the life events. Additionally, the itinerary 500 may omit the routes between the life events.

FIG. 6 is a block diagram of an example system for life event based travel planning, in accordance with some embodiments of the present disclosure. The system may include a device 600 that may operate as a computing device and may be in communication with a network 140. For example, the device 600 may include a desktop computer, a laptop computer, a tablet computer, a mobile phone, a smartphone, a personal digital assistant (PDA), an e-reader device, or other suitable computer device. The network 140 may be similar or identical to the network 140 of FIG. 1 and FIG. 2. Any of the travel planning server 110, the travel planning client 120, and/or the traveler portable device 130 may be implemented as the device 600. Additionally or alternatively, the travel planning server 110, the travel planning client 120, and/or the traveler portable device 130 may be implemented as a single device such as the device 600. Additionally or alternatively, any modules or sub-components of the travel planning server 110, the travel planning client 120, and/or the traveler portable device 130 may be implemented as the device 600.

The device 600 may include a processor 610, a memory 620, a data storage 630, and a communication component 640. The processor 610, the memory 620, the data storage 630, and/or the communication component 640 may all be communicatively coupled such that each of the components may communicate with the other components. The device 600 may perform any of the operations described in the present disclosure.

In general, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, the processor 610 may include any number of processors configured to perform, individually or collectively, any number of operations described in the present disclosure.

In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions in the memory 620. After the program instructions are loaded into memory 620, the processor 610 may execute the program instructions.

For example, in some embodiments one or more of the life event module 211, the electronic content module 212, the location module 213, the transportation module 214, the booking module 215, the delivery module 216, the tracking module 217, the planning module 222, the positioning module 232, or the display module 234 of FIG. 2 may be included in the data storage 630 as program instructions. The processor 610 may fetch the instructions of one or more of said modules and may load the program instructions of said modules in the memory 620. After the program instructions of said modules are loaded into the memory 620, the processor 610 may execute the program instructions such that the computing device 600 may implement the operations associated with said modules as directed by the instructions.

The memory 620 and the data storage 630 may include computer-readable storage media for carrying or having computer-executable instructions or data structures stored thereon. Such computer-readable storage media may include any available media that may be accessed by a general-purpose or special-purpose computer, such as the processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication component 640 may include any device, system, component, or collection of components configured to allow or facilitate communication between the device 600 and the network 140. For example, the communication component 640 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The communication component 640 may permit data to be exchanged with any network (including the network 140) such as a cellular network, a WiFi network, a MAN, an optical network, etc., to name a few examples, and/or any other devices described in the present disclosure, including remote devices.

Modifications, additions, or omissions may be made to FIG. 6 without departing from the scope of the present disclosure. For example, the device 600 may include more or fewer elements than those illustrated and described in the present disclosure. For example, the device 600 may include an integrated display device such as a screen of a tablet or mobile phone or may include an external monitor, a projector, a television, or other suitable display device that may be separate from and communicatively coupled to the device 600.

Figure 7:
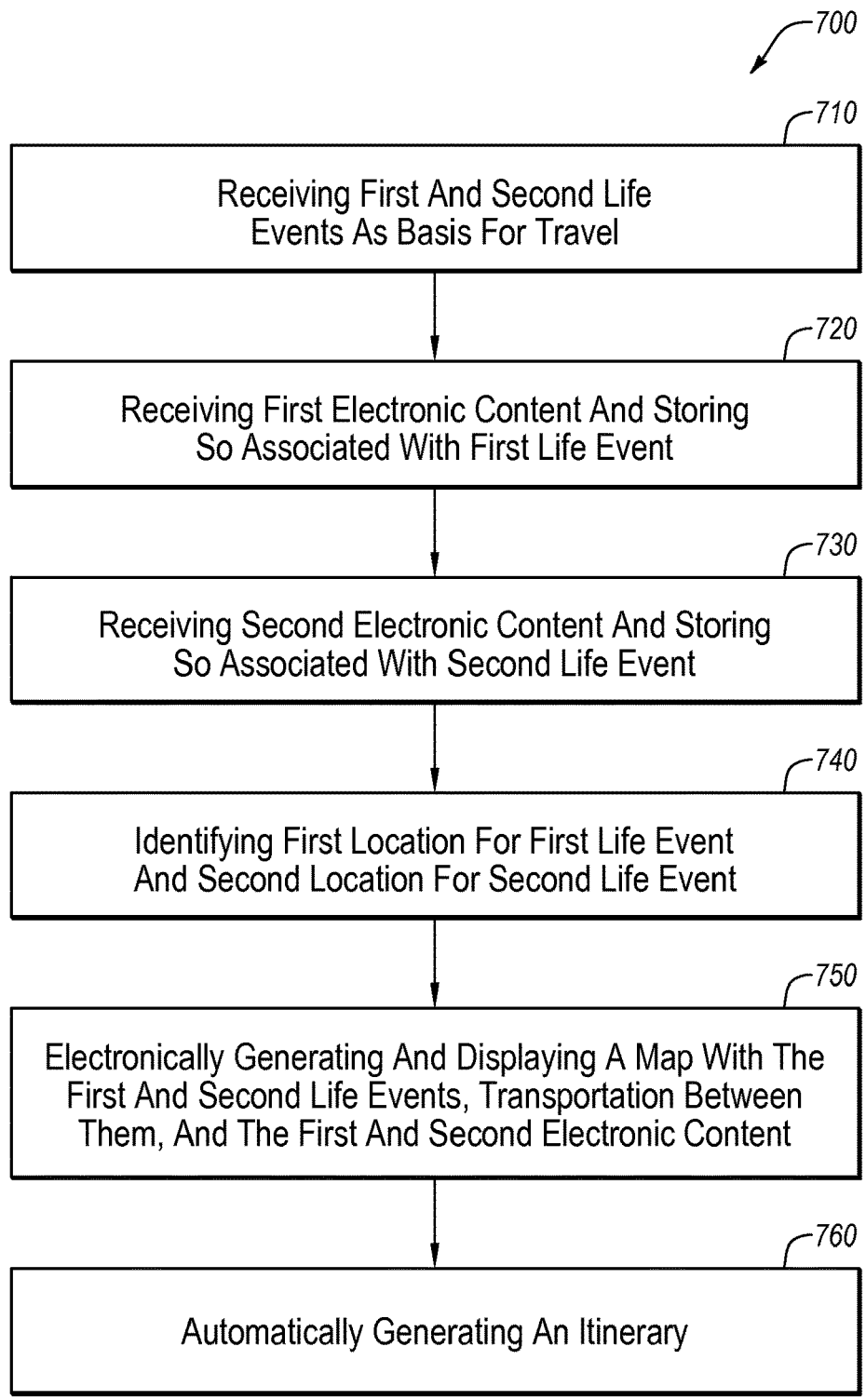
FIG. 7 is a flow chart of an example method of life event based travel planning.

FIG. 7 is a flow chart of an example method of life event-based travel planning, in accordance with some embodiments of the present disclosure. The method 700 may be performed by any suitable system, apparatus, or device. For example, the system 100 of FIG. 1, the systems 200 of FIG. 2, and/or the travel planning server 110 of FIG. 1 and/or FIG. 2 may perform one or more of the operations associated with the method 700. Although illustrated with discrete blocks, the steps and operations associated with one or more of the blocks of the method 700 may be divided into additional blocks, combined into fewer blocks, or eliminated, depending on the desired implementation.

At block 710, a first and a second life event may be obtained as the basis for travel. For example, a travel planning server (for example, the travel planning server 110 of FIG. 1) may receive from a travel planning client (such as the travel planning client 120 of FIG. 1) a user selection of the first and the second life events from a prioritized list of life events automatically generated by analyzing social networking data (for example, social networking data received from one or more social networking servers via the network 140 of FIG. 1). Additionally or alternatively, for example, a travel planning server may automatically select the first and the second life events by analyzing social networking data.

At block 720, first electronic content may be received and stored such that the first electronic content may be associated with the first life event. For example, if the social media entries identifying the first life event had a photograph, that photograph may be stored in association with the first life event in a travel planning server (for example, the travel planning server 110 of FIG. 1). Additionally or alternatively, a user (for example, a user using the travel planning client 120 of FIG. 1) or third party (for example, using a computing device and communicating via the network 140 of FIG. 1) may submit the first electronic content as associated with the first life event.

At block 730, second electronic content may be received and stored such that the second electronic content may be associated with the second life event. For example, if the social media entries identifying the second life event had a video, that video may be stored in association with the second life event in a travel planning server (for example, the travel planning server 110 of FIG. 1). Additionally or alternatively, a user or third party may submit the second electronic content as associated with the second life event.

At block 740, a first location for the first life event and a second location for the second life event may be identified. For example, an address for the first life event may be pulled from a social media entry about the first life event and a user may input the latitude and longitude of the second life event by identifying the location of the second life event on an electronic map. As another example, a restaurant name may be pulled from a social media entry about the first life event and the address of the restaurant may be pulled from a website of the restaurant.

At block 750, a map may be electronically generated by a travel planning server (for example, the travel planning server 110 of FIG. 1). The map may include the first and second life events at their respective locations, transportation options between the first and the second life events, and the first and the second life events. For example, the first electronic content (e.g. the photograph of the first life event) may be displayed proximate the first life event on the map and the second electronic content (e.g. the video of the second life event) may be displayed proximate the second life event. As another example, the transportation options may include a taxi option, a walking option, and a bus option. In some embodiments, the map may be displayed, stored, and/or may be transmitted to another device to be displayed and/or stored.

At block 760, an itinerary may be automatically generated of the travel based on the first and the second life events by a travel planning server (for example, the travel planning server 110 of FIG. 1). The itinerary may include the first and the second life events, the first and the second electronic content, and a transportation mode between the first and the second life events. In some embodiments, the first electronic content may be positioned proximate the first life event on the itinerary and/or the second electronic content may be positioned proximate the second life event on the itinerary. The itinerary may also include additional information about any or all of the first and/or the second life events, the transportation mode, etc. In some embodiments, the itinerary may be displayed, stored, and/or may be transmitted to another device to be displayed and/or stored. The itinerary may then be delivered to a traveler mobile device (such as the traveler mobile device 130 of FIG. 1), or stored at the travel planning server for future delivery to the mobile device of a traveler.

Accordingly, the method 700 may be used to plan life-event based travel. Modifications, additions, or omissions may be made to the method 700 without departing from the scope of the present disclosure. For example, the operations of the method 700 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments. All of the examples provided above are non-limiting and merely serve to illustrate the flexibility and breadth of the present disclosure.

Figure 8A:
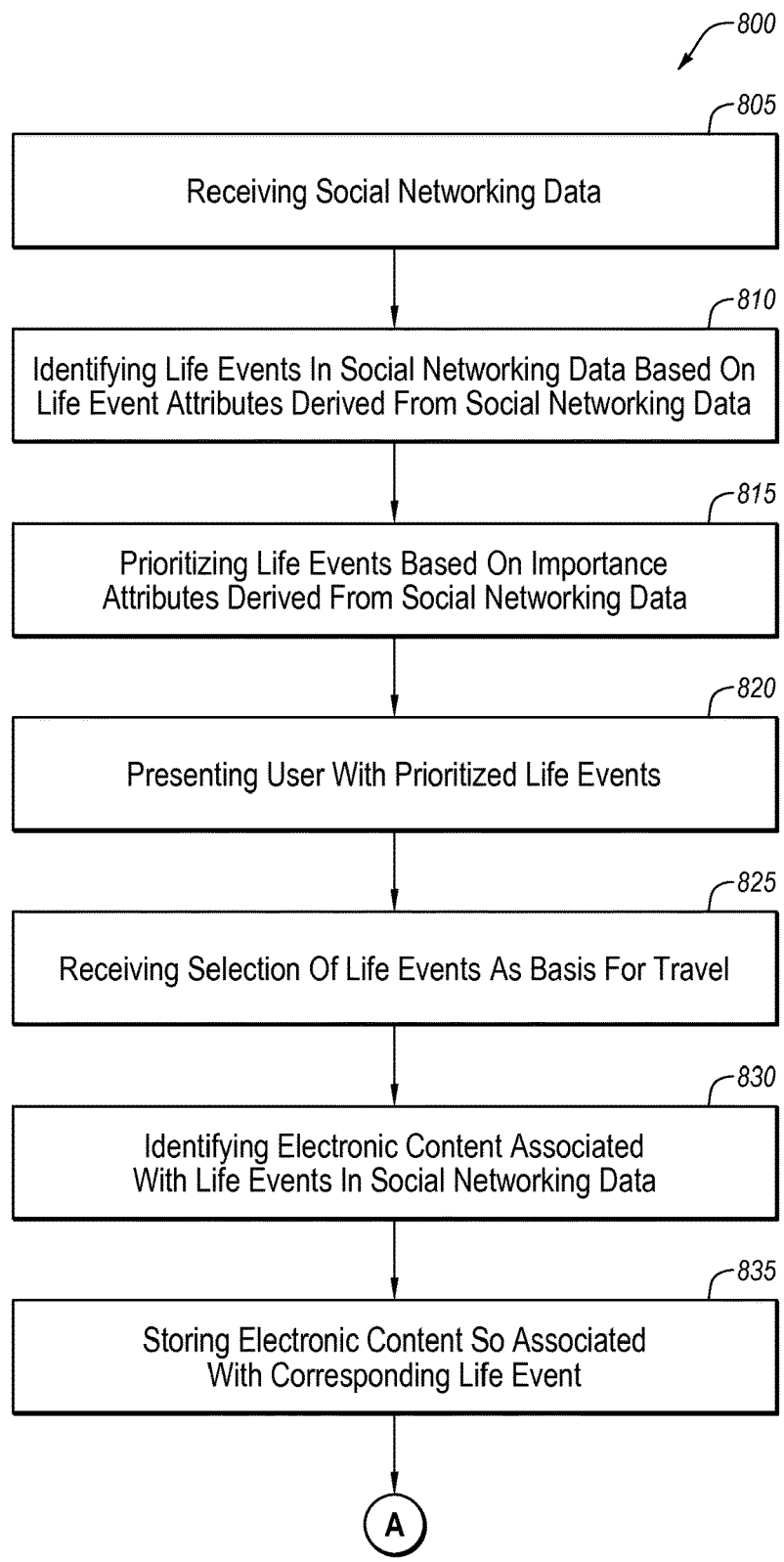
FIGS. 8A and 8B are a flow chart of another example method of life event based travel planning.
Figure 8B:
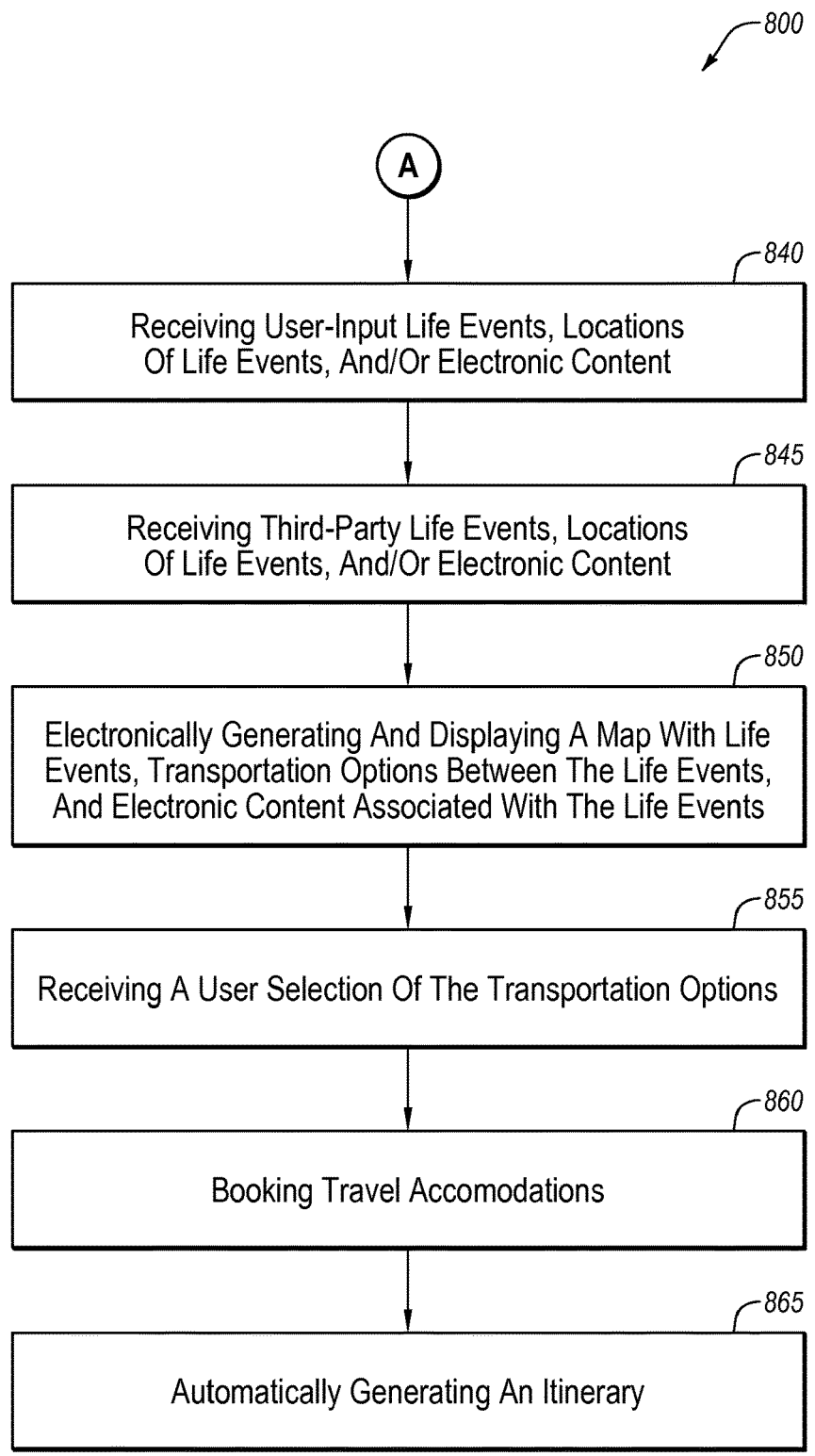

FIGS. 8A and 8B are a flow chart of another example method of life event-based travel planning, in accordance with some embodiments of the present disclosure. The method 800 may be performed by any suitable system, apparatus, or device. For example, the system 100 of FIG. 1, the systems 200 of FIG. 2, and/or the travel planning server 110 of FIG. 1 and/or FIG. 2 may perform one or more of the operations associated with the method 800. Although illustrated with discrete blocks, the steps and operations associated with one or more of the blocks of the method 800 may be divided into additional blocks, combined into fewer blocks, or eliminated, depending on the desired implementation.

At block 805, social networking data may be received. For example, a travel planning server may receive social networking data from one or more sources (such as social networking servers via a network, e.g. the network 140 of FIG. 1) and/or from one or more users or third parties (e.g. via the network 140 of FIG. 1).

At block 810, life events may be identified within the social networking data based on life event attributes derived from the social networking data. For example, the life events may be identified by a travel planning server (e.g. the travel planning server 110 of FIG. 1) based on terms used in the social networking data, a number of votes, a category of information, etc.

At block 815, the life events may be prioritized into a list of life events based on importance attributes derived from the social networking data. For example, one or more of the life event attributes may be given a certain weight as importance attributes and the importance attributes may be summed. The list of life events may be prioritized based on the summed values. The prioritized list of life events may be transmitted to a user for review and selection of one or more life events as the basis for travel, for example, from the travel planning server to a travel planning client (for example, the travel planning client 120 of FIG. 1).

At block 820, a user may be presented with the prioritized list of life events, for example, at a travel planning client. The list may include electronic content associated with the life events, or may not include electronic content. The list may include additional information about the life events, such as the location, number of votes, importance attributes, life event attributes, etc. At block 825, a selection of life events as the basis for travel may be received. For example, the user may make a selection of life events at a travel planning client that may be transmitted to a travel planning server.

At block 830, electronic content associated with the life events may be identified in the social networking data. For example, social media entries that may have identified or been the basis of a life event may have an associated picture, video, slideshow, etc. At block 835, the identified electronic content may be stored so that the electronic content is associated with the corresponding life event. For example, there may be a database entry, a pointer, or other association such that the electronic content is associated with the corresponding life event when stored at the travel planning server.

At block 840 (illustrated in FIG. 8B), user-input life events, locations of life events, and/or electronic content may be received. For example, the user may manually enter life events to be included in travel plans at the travel planning client. Additionally or alternatively, the user may be requested or may choose to identify the location of a life event, and/or may submit electronic content associated with one or more of the life events at the travel planning client to be transmitted to the travel planning server. Any of these user inputs may be in response to a request from a travel planning server.

At block 845, life events, locations of life events, and/or electronic content input by one or more third parties may be received. For example, a third-party may manually enter life events to be included in travel plans at a computing device to be transmitted to the travel planning server via a network (for example, the network 140 of FIG. 1). Additionally or alternatively, the third-party may be requested or may choose to identify the location of a life event, and/or may submit electronic content associated with one or more of the life events. Any of these third-party inputs may be in response to a request from a travel planning server and/or a request from a user.

At block 850, a map may be electronically generated. Electronically generating a map at block 850 may be similar to block 750 of FIG. 7. At block 855, a user selection of one or more of the transportation options on the electronically generated map may be received. For example, the map may include a user-selectable feature to facilitate a user interacting with or selecting a feature or option from the map. The user may make such a selection at a travel planning client and that selection may be transmitted via a network to a travel planning server.

At block 860, travel accommodations associated with selections made on the map may be booked. For example, bus tickets for a bus option selected may be purchased, or reservations may be made at a restaurant at one of the life event locations, etc. In some embodiments, other travel accommodations may also be booked, such as lodging, meals not associated with life events, etc. The booking may be done automatically b the travel planning server.

At block 865, an itinerary may be automatically generated of the travel based on the life events. Automatically generating an itinerary may be similar to block 760 of FIG. 7. For example, the itinerary may then be sent to a traveler mobile device or may be stored at a travel planning server for later transmission to a traveler mobile device.

Accordingly, the method 800 may be used to plan life event-based travel. Modifications, additions, or omissions may be made to the method 800 without departing from the scope of the present disclosure. For example, the operations of the method 800 may be implemented in differing order. By way of non-limiting example, the block 860 may be performed after the block 865, the blocks 830 and 835 may be performed after or concurrently with block 810, blocks 840 and 845 may be performed before any of the preceding blocks, etc. Additionally or alternatively, two or more operations may be performed at the same time. By way of non-limiting example, the blocks 840 and 845 may be performed concurrently, the blocks 810, 815, 830, and/or 835 may be performed concurrently, etc. Furthermore, the outlined operations and actions are provided as examples, and some of the operations and actions may be optional, combined into fewer operations and actions, or expanded into additional operations and actions without detracting from the essence of the disclosed embodiments. By way of non-limiting example, the blocks 840 and 845 may be omitted, the block 860 may be omitted, and the blocks 805, 810, 815, 820, 825, 830, and 835 may be omitted. All of the examples provided above are non-limiting and merely serve to illustrate the flexibility and breadth of the present disclosure.

Figure 9:
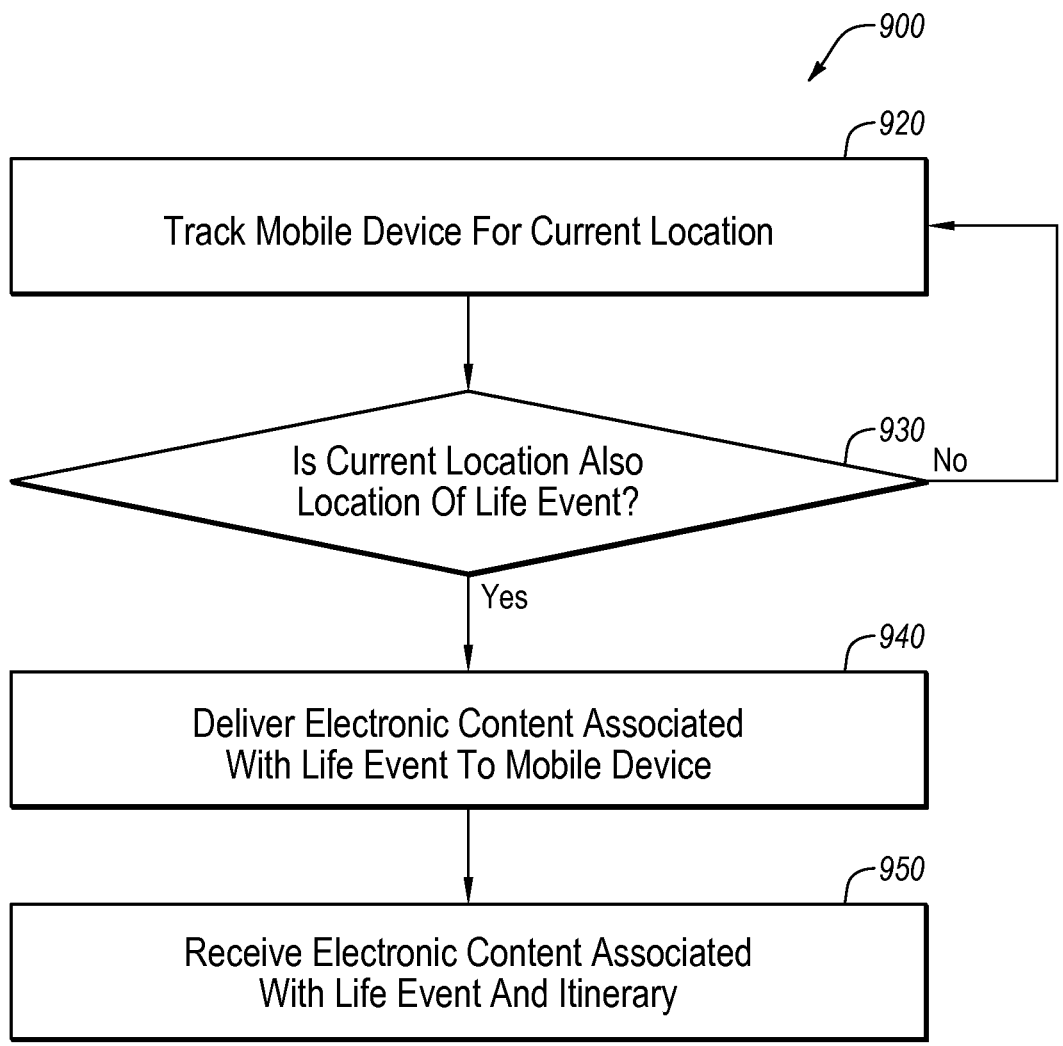
FIG. 9 is a flow chart of an example method of life event based travel.

FIG. 9 is a flow chart of an example method of life event-based travel, in accordance with some embodiments of the present disclosure. The method 900 may be performed by any suitable system, apparatus, or device. For example, the system 100 of FIG. 1, the systems 200 of FIG. 2, and/or the travel planning server 110 of FIG. 1 and/or FIG. 2 may perform one or more of the operations associated with the method 900. Although illustrated with discrete blocks, the steps and operations associated with one or more of the blocks of the method 900 may be divided into additional blocks, combined into fewer blocks, or eliminated, depending on the desired implementation.

At block 920, a portable device of a traveler may be tracked for a current location of the traveler. For example, in response to the traveler beginning travel according to an itinerary, the portable device of the traveler may be tracked using GPS, etc. Additionally or alternatively, the traveler may follow an itinerary generated using the method 700 of FIG. 7 or the method 800 of FIG. 8. At block 930, a determination may be made as to whether the traveler is currently at the location of one of the life events. For example, the coordinates of the portable device of the traveler may be compared to the coordinates of the life event. If it is determined that the current location of the portable device of the traveler is not the location of any of the life events, the method 900 may proceed back to the block 920. If it is determined that the current location of the portable device of the traveler is the same as the location of one of the life events, the method 900 may proceed to block 940.

At the block 940, electronic content associated with the life event where the portable device of the traveler is located may be delivered to the portable device of the traveler. For example, if the traveler is operating an application associated with a travel planning server on the portable device of the traveler, the application may receive and/or request the electronic content associated with the life event at the current location of the portable device of the traveler. For example, a video of the life event may be delivered to the portable device of the traveler when the traveler arrives at the location of the life event. In some embodiments, delivering electronic content may include sending an instruction to display the content, for example, when the electronic content is already stored on the portable device of the traveler.

At block 950, electronic content associated with the life event and the itinerary may be received. For example, the traveler may take pictures or record a video while at the location of the life event and may upload that electronic content using an application associated with the travel planning server. The uploaded electronic content may be associated with that life event in the itinerary such that the traveler and/or others may view the electronic content that may be generated at the time in which the traveler visited the location of the life event.

Accordingly, the method 900 may be illustrative of life-event based travel. Modifications, additions, or omissions may be made to the method 900 without departing from the scope of the present disclosure. For example, the operations of the method 900 may be implemented in differing order. Additionally or alternatively, two or more operations may be performed at the same time. For example, the blocks 940 and 950 may be done in the opposite order illustrated and/or may be performed concurrently. Furthermore, the outlined operations and actions are provided as examples, and some of the operations and actions may be optional, combined into fewer operations and actions, or expanded into additional operations and actions without detracting from the essence of the disclosed embodiments. For example, the block 950 may be omitted. All of the examples provided above are non-limiting and merely serve to illustrate the flexibility and breadth of the present disclosure.

The implementations described herein may include the use of a special purpose or general-purpose computer including various computer hardware or software modules, as discussed in greater detail below.

Embodiments within the scope of the technology disclosed herein may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of automated travel planning, the method comprising:
obtaining social networking data regarding a traveler;

based on importance attributes of life events derived from the social networking data, obtaining a first life event and a second life event as a basis for travel of the traveler;

requesting first electronic content regarding the first life event from a third party;

receiving the first electronic content from the third party and a request from the third party that the first electronic content remain temporarily hidden from the traveler, and storing the first electronic content such that the first electronic content is associated with the first life event;

receiving second electronic content and storing the second electronic content such that the second electronic content is associated with the second life event;

identifying a first location for the first life event and a second location for the second life event;

electronically generating a map of the first life event and the second life event, the map including transportation between the first location and the second location, the map also including the first electronic content associated with the first life event and the second electronic content associated with the second life event;

automatically generating an itinerary, the itinerary including the transportation between the first life event and the second life event;

presenting the itinerary to the traveler, the itinerary displaying a representation of the second electronic content as associated with the second life event and hiding the first electronic content from the traveler in the itinerary until the traveler arrives at the first location based on the request from the third party;

tracking a portable device of the traveler for a current location of the traveler using a global positioning system (GPS) device of the portable device;

determining whether the current location of the traveler is the first location and based on a determination that the current location of the traveler is the first location, transmitting the first electronic content of a first type to the portable device of the traveler along with first additional electronic content of a type different from the first type; and determining whether the current location of the traveler is the second location and based on a determination that the current location of the traveler is the second location, transmitting the second electronic content of a second type to the portable device of the traveler along with second additional electronic content of a type different from the second type.

2. The method of claim 1, wherein obtaining a first life event and a second life event comprises:

identifying the first life event and the second life event in the social networking data by analyzing life event attributes of the social networking data;

prioritizing the first life event and the second life event based on the importance attributes derived from the social networking data;

transmitting the prioritized life events to the traveler; and receiving a selection of life events from the prioritized life events.

3. The method of claim 2, wherein receiving first electronic content and storing the first electronic content such that the first electronic content is associated with the first life event comprises;

identifying the first electronic content in the social networking data based on the first electronic content being part of a social media entry contributing to the identification of the first life event; and storing the first electronic content such that the first electronic content is associated with the first life event.

4. The method of claim 1, wherein obtaining the first life event and the second life event comprises receiving at least one of the first life event or the second life event as a user-input life event.

5. The method of claim 1, wherein receiving the second electronic content comprises:

receiving the second electronic content as user-input electronic content; and storing the second electronic content such that the second electronic content is associated with the second life event.

6. The method of claim 1, wherein identifying the first location comprises requesting traveler identification of the first location.

7. The method of claim 1, wherein automatically generating the itinerary comprises booking the transportation between the first location and the second location.

8. The method of claim 1, wherein electronically generating the map further comprises:

determining a plurality of transportation options between the first location and the second location;

generating a route for each of the transportation options, a cost for each of the transportation options, and a travel time for each of the transportation options on the map; and transmitting the map to the traveler for selecting one of the plurality of transportation options.

9. A travel planning system comprising:

one or more processors; and a computer-readable medium having instructions stored thereon that are configured to, in response to being executed by the one or more processors, cause the system to perform one or more operations, the operations comprising:

obtaining social networking data regarding a traveler;

based on importance attributes of life events derived from the social networking data, obtaining a first life event and a second life event as a basis for travel of the traveler;

requesting first electronic content regarding the first life event from a third party;

receiving the first electronic content from the third party and a request from the third party that the first electronic content remain temporarily hidden from the traveler, and storing the first electronic content such that the first electronic content is associated with the first life event;

receiving second electronic content and storing the second electronic content such that the second electronic content is associated with the second life event;

identifying a first location for the first life event and a second location for the second life event;

electronically generating a map of the first life event and the second life event, the map including transportation between the first location and the second location, the map also including the first electronic content associated with the first life event and the second electronic content associated with the second life event;

automatically generating an itinerary, the itinerary including the transportation between the first life event and the second life event;

presenting the itinerary to the traveler, the itinerary displaying a representation of the second electronic content as associated with the second life event and hiding the first electronic content from the traveler in the itinerary until the traveler arrives at the first location based on the request from the third party;

tracking a portable device of the traveler for a current location of the traveler using a global positioning system (GPS) device of the portable device;

determining whether the current location of the traveler is the first location and based on a determination that the current location of the traveler is the first location, transmitting the first electronic content of a first type to the portable device of the traveler along with first additional electronic content of a type different from the first type; and determining whether the current location of the traveler is the second location and based on a determination that the current location of the traveler is the second location, transmitting the second electronic content of a second type to the portable device of the traveler along with second additional electronic content of a type different from the second type.

10. The travel planning system of claim 9, wherein obtaining a first life event and a second life event comprises:
   identifying the first life event and the second life event in the social networking data by analyzing life event attributes of the social networking data;
   prioritizing the first life event and the second life event based on the importance attributes derived from the social networking data;
   transmitting the prioritized life events to the traveler; and
   receiving a selection of life events from the prioritized life events.

11. The travel planning system of claim 10, wherein receiving first electronic content and storing the first electronic content such that the first electronic content is associated with the first life event comprises;
   identifying the first electronic content in the social networking data based on the first electronic content being part of a social media entry contributing to the identification of the first life event; and
   storing the first electronic content such that the first electronic content is associated with the first life event.

12. The travel planning system of claim 9, wherein obtaining the first life event and the second life event comprises receiving at least one of the first life event or the second life event as one of a traveler-input life event or a third-party input life event.

13. The travel planning system of claim 9, wherein identifying the first location comprises requesting one of traveler identification of the first location or third-party identification of the first location.

14. The travel planning system of claim 9, wherein automatically generating the itinerary comprises booking the transportation between the first location and the second location.

15. The travel planning system of claim 9, wherein electronically generating the map further comprises:
   determining a plurality of transportation options between the first location and the second location;
   presenting a route for each of the transportation options, a cost for each of the transportation options, and a travel time for each of the transportation options on the map; and
   presenting a traveler-selectable feature on the map for selecting one of the plurality of transportation options.

16. A method comprising:
   obtaining social networking data regarding a traveler;
   based on importance attributes of life events derived from the social networking data, obtaining an automatically generated itinerary, the automatically generated itinerary including transportation between a first life event and a second life event of the itinerary for the traveler, and first electronic content associated with the first life event and second electronic content associated with the second life event;
   presenting the itinerary to the traveler, the itinerary displaying a representation of the second electronic content as associated with the second life event and hiding the first electronic content from the traveler in the itinerary until the traveler arrives at a location of the first life event based on a request from a third party that provided the first electronic content, the request requesting that the first electronic content be temporarily hidden from the traveler;
   tracking a portable device of the traveler to determine a current location of the portable device of the traveler using a global positioning system (GPS) device of the portable device;
   comparing the current location with the location of the first life event and a location of the second life event, the first life event and the second life event being part of the automatically generated itinerary of life event-based travel and having first electronic content associated with the first life event and second electronic content associated with the second life event; and
   based on a determination that the current location is the location of the first life event, delivering the first electronic content to the portable device of the traveler and permitting the traveler to observe a representation of the first electronic content in the itinerary.

17. The method of claim 16, further comprising receiving other electronic content from the portable device of the traveler, the other electronic content associated with the first life event and the automatically generated itinerary.

* * * * *